(12) United States Patent
Kam

(10) Patent No.: US 8,994,339 B1
(45) Date of Patent: Mar. 31, 2015

(54) BATTERY TEMPERATURE COMPENSATION WITH CLOSED-LOOP FAN CONTROL

(75) Inventor: Pascal C. Kam, Union City, CA (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 13/369,732

(22) Filed: Feb. 9, 2012

(51) Int. Cl.
 *H02J 7/16* (2006.01)
 *H02J 7/00* (2006.01)
 *H01M 10/50* (2006.01)

(52) U.S. Cl.
 CPC .................... *H02J 7/0029* (2013.01)
 USPC .............. 320/150; 320/160; 429/62

(58) Field of Classification Search
 USPC .............. 320/150–154, 160; 429/62
 See application file for complete search history.

(56) References Cited

U.S. PATENT DOCUMENTS

| | | | |
|---|---|---|---|
| 7,646,176 B2 * | 1/2010 | Yamamoto .................... | 320/150 |
| 8,050,029 B1 | 11/2011 | Kam et al. | |
| 8,803,477 B2 * | 8/2014 | Kittell ........................... | 320/112 |
| 2004/0075417 A1 * | 4/2004 | Aradachi et al. .............. | 320/107 |
| 2007/0027580 A1 * | 2/2007 | Ligtenberg et al. ........... | 700/300 |
| 2008/0055848 A1 | 3/2008 | Hamburgen et al. | |
| 2009/0015205 A1 * | 1/2009 | Katayama ..................... | 320/134 |
| 2009/0115251 A1 * | 5/2009 | Nakamura et al. ............. | 307/32 |
| 2010/0090650 A1 * | 4/2010 | Yazami et al. ................ | 320/132 |
| 2010/0283431 A1 * | 11/2010 | Kano ............................. | 320/150 |
| 2011/0043042 A1 * | 2/2011 | Klikic et al. ................... | 307/66 |
| 2012/0256569 A1 * | 10/2012 | Kawahara et al. ............ | 318/139 |

FOREIGN PATENT DOCUMENTS

WO WO2011045853 A1 * 4/2011 .................... 318/139

OTHER PUBLICATIONS

Ton et al., "DC Power for Improved Data Center Efficiency," Lawrence Berkeley National Laboratory, Jan. 2007, 78 pages.
Patterson, "The Effect of Data Center Temperature on Energy," Efficiency, Intel Corporation, IEEE 2008, pp. 1167-1174.
(Continued)

*Primary Examiner* — Richard V Muralidar
*Assistant Examiner* — David V Henze-Gongola
(74) *Attorney, Agent, or Firm* — Lerner, David, Littenberg, Krumholz & Mentlik, LLP

(57) ABSTRACT

A dual-loop control configuration employs battery temperature as a feedback metric in order to prevent overheating when recharging batteries. Temperature sensors are used to obtain the battery temperature. Depending on the battery temperature that is measured, a processing device such as a battery interface module determines whether that temperature exceeds a temperature threshold. The processing device also determines a charge rate of the batteries. The processing device is configured to vary the fan speed to increase or decrease airflow for cooling the batteries based on this information, and also regulates the charge rate of the batteries as a function of the fan speed. This arrangement may be used as part of a battery backup system, such as in an uninterruptible power supply used in a data center. Alternatively, it may be used in the power supply system of an electric vehicle. Fluids besides air may also be employed.

26 Claims, 9 Drawing Sheets

(56) References Cited

OTHER PUBLICATIONS

Hamilton, "Where Does the Power Go & What to do About it?", Conference on Innovative Data Systems Research, Jan. 7, 2009, Amazon Web Services, 24 pages.

Battery Technology for Data Centers and Network Rooms: VRLA Reliability and Safety, White Paper# 39, 2003, American Power Conversion, 12 pages.

Jones, Charge Control Options for Valve Regulated Lead Acid Batteries, White Paper: TW 0060, TDI Power, Aug. 17, 2004, 12 pages.

* cited by examiner

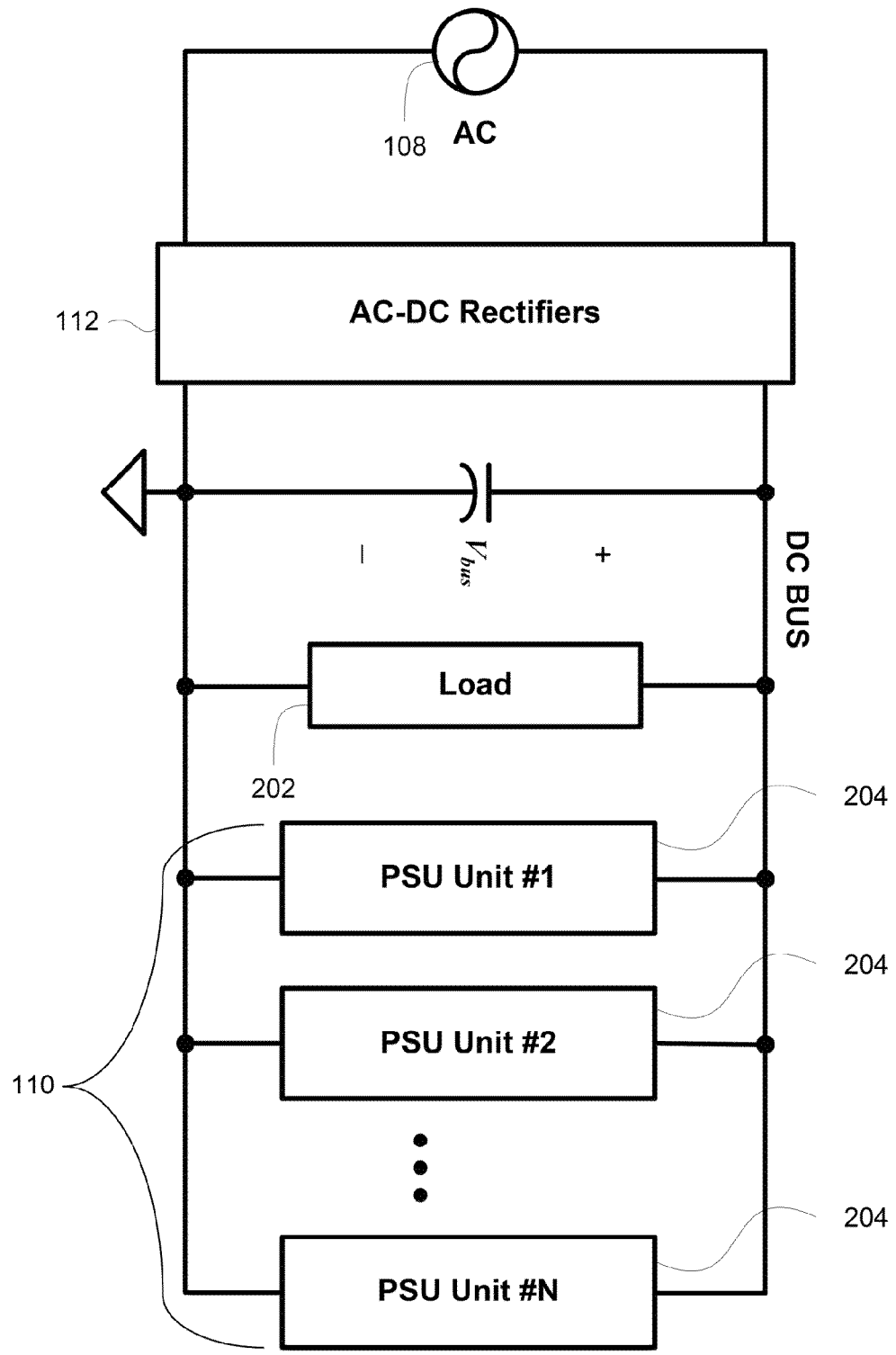

BATTERY TEMPERATURE COMPENSATION WITH CLOSED-LOOP FAN CONTROL

BACKGROUND

Batteries are used to power a wide variety of electronic equipment. Examples of such electronic equipment include computing systems that may be used in data centers and other types of computer networks. In many cases, these systems use rechargeable batteries as part of an uninterruptible power supply ("UPS"). Lead acid technology is often used in such rechargeable batteries.

Battery temperature may rise during charging and discharging cycles. The battery temperature may also be affected by external factors. This may include closely spacing multiple batteries within the UPS housing, poor ventilation, etc. While some increase in temperature may provide a short term gain during discharge, a rechargeable battery may lose a significant amount of its expected lifetime (e.g., its design life or service life) if maintained at elevated temperatures. This, in turn, results in increased replacement cost and other associated expenses.

SUMMARY

According to one embodiment, a charging system for a battery comprises a charging circuit, a sensor and a fan. The charging circuit is coupled to at least one battery maintained in a housing. The charging circuit is configured to charge the at least one battery. The sensor is configured to measure a temperature of the at least one battery. The fan is associated with the housing for creating airflow through the housing to cool the at least one battery. The charging system also includes a module configured to receive temperature measurements from the sensor. The module is further configured to increase or decrease a speed of the fan based on the temperature measurements, and to regulate the charging circuit to increase or decrease a charge rate of the at least one battery as a function of the fan speed.

In one example, the system determines a maximum measured battery temperature. When the maximum measured battery temperature does not exceed a temperature threshold, the module decreases the fan speed and increases the charge rate. In another example, the system determines a maximum measured battery temperature. Here, when the maximum measured battery temperature exceeds a temperature threshold and the battery is being charged at less than a maximum charge rate, the module increases the charge rate.

In a further example, the system determines a maximum measured battery temperature. When the maximum measured battery temperature exceeds a temperature threshold, the battery is being charged at a maximum charge rate, and the fan speed is not at a maximum speed, the module increases the fan speed. In yet another example, the system determines a maximum measured battery temperature, and when the maximum measured battery temperature exceeds a temperature threshold, the battery is being charged at a maximum charge rate, and the fan speed is a maximum speed, the module decreases the charge rate.

According to another example, the at least one battery comprises a plurality of batteries, the sensor comprises a plurality of sensors arranged to measure the temperature for corresponding ones of the plurality of batteries, and the module determines a maximum measured battery temperature for a given one of the plurality of batteries based on the temperature measurements received from the plurality of sensors. The module is configured to increase or decrease a speed of the fan based on the maximum measured battery temperature.

In yet another example, the at least one battery comprises a plurality of batteries, the sensor comprises a plurality of sensors arranged to measure the temperature for corresponding ones of the plurality of batteries, and the module determines an average battery temperature of one or more of the plurality of batteries based on the temperature measurements received from the plurality of sensors. The module is configured to increase or decrease a speed of the fan based on the average battery temperature.

In another example, the at least one battery comprises a plurality of batteries and the sensor comprises a plurality of sensors. A first set of the plurality of sensors is arranged to measure the temperature for corresponding ones of the plurality of batteries and a second set of the plurality of sensors is arranged in the housing to measure temperatures in the housing. The module determines a maximum battery temperature for the housing and the plurality of batteries based on the temperature measurements received from the first and second sets of the plurality of sensors.

And in yet another example, the at least one battery comprises a plurality of batteries arranged in series. Here, the charging circuit is configured to charge the plurality of batteries at the same charge rate. The sensor comprises a plurality of sensors arranged to measure the temperature for corresponding ones of the plurality of batteries. The module determines a maximum battery temperature in the housing based on the temperature measurements received from the plurality of sensors.

Another embodiment provides for a method of controlling charging of a battery. The method comprises receiving a battery temperature from one or more sensors in a battery housing; determining, by a processing device, whether the received battery temperature exceeds a temperature threshold; determining a charge rate of the battery; varying, by the processing device, a speed of a fan based on the temperature measurements to increase or decrease airflow across the battery; and regulating, by the processing device, the charge rate of the battery as a function of the fan speed.

In one example, when the received battery temperature does not exceed a temperature threshold, varying the speed of the fan is done by decreasing the fan speed, and regulating the charge rate is done by increasing the charge rate.

In another example, when the received battery temperature exceeds a temperature threshold, the method also includes determining whether the battery is being charged at less than a maximum charge rate, and increasing the charge rate when the battery is not being charged at the maximum charge rate.

In a further example, when the received battery temperature exceeds a temperature threshold, the method determines whether the battery is being charged at a maximum charge rate, determines whether the fan speed is at a maximum speed, and increases the fan speed when the battery is being charged at the maximum charge rate and the fan speed is not at the maximum speed.

In yet another example, when the received battery temperature exceeds a temperature threshold, the process further includes determining whether the battery is being charged at a maximum charge rate; determining whether the fan speed is at a maximum speed; and decreasing the charge rate when the battery is being charged at the maximum charge rate and the fan speed is at the maximum speed.

In an alternative, the battery comprises a plurality of batteries and the one or more sensors comprises a plurality of sensors arranged to measure the temperature for corresponding ones of the plurality of batteries. Here, the method further comprises determining a maximum battery temperature for a given one of the plurality of batteries based on the temperature measurements received from the plurality of sensors.

In another alternative, the battery comprises a plurality of batteries and the one or more sensors comprises a plurality of sensors arranged to measure the temperature for corresponding ones of the plurality of batteries. In this case, the method further comprises determining an average battery temperature of one or more of the plurality of batteries based on the temperature measurements received from the plurality of sensors.

And in another alternative, the battery comprises a plurality of batteries and the one or more sensors comprises a plurality of sensors. The first set of the plurality of sensors is arranged to measure the temperature for corresponding ones of the plurality of batteries and a second set of the plurality of sensors is arranged in the housing to measure temperatures in the housing. The method further comprises determining a maximum battery temperature for the housing and the plurality of batteries based on the temperature measurements received from the first and second sets of the plurality of sensors.

According to another embodiment, a battery charging apparatus is provided. The apparatus comprises a plurality of batteries arranged in a battery housing, a charging circuit coupled to the plurality of batteries and one or more sensors configured to measure a temperature of the plurality of batteries. The apparatus also includes cooling means for creating airflow through the battery housing to cool the plurality of batteries, and a module configured to receive temperature measurements from the one or more sensors. The module is also configured to increase or decrease the airflow based on the temperature measurements and to regulate the charging circuit to increase or decrease a charge rate of the plurality of batteries as a function of the airflow.

In one example, the plurality of batteries is stored in a battery tray of the battery housing. Here, the cooling means comprises a fan disposed in the battery housing.

In another example, the battery charging apparatus is disposed in a system including a plurality of shelves supporting one or more of servers, hard disk drives and network switches. The system includes a battery backup having the plurality of batteries, and the plurality of batteries includes a first set of batteries stored in a first battery tray and a second set of batteries stored in a second battery tray. In this example, the module comprises a first battery interface module and a second battery interface module. The first battery interface module is configured to receive first temperature measurements from the one or more sensors associated with the first set of batteries, to increase or decrease the airflow to the first set of batteries based on the first temperature measurements, and to regulate the increase or decrease of the charge rate of the first set of batteries. The second battery interface module is configured to receive second temperature measurements from the one or more sensors associated with the second set of batteries, to increase or decrease the airflow to the second set of batteries based on the second temperature measurements, and to regulate the increase or decrease of the charge rate of the second set of batteries.

In another example, the battery charging apparatus is disposed in a vehicle, and the cooling means creates the airflow using air from outside of the vehicle. In this case, the cooling means may be configured to condition the air from outside of the vehicle based on a condition of the plurality of batteries or a capacity remaining in the batteries.

According to a further embodiment, a battery charging and cooling apparatus comprises a plurality of batteries arranged in a battery housing, a charging circuit coupled to the plurality of batteries, one or more sensors configured to measure a temperature of the plurality of batteries, cooling means for creating fluid flow through the battery housing to cool the plurality of batteries, and a module configured to receive temperature measurements from the one or more sensors. The module is also configured to increase or decrease the airflow based on the temperature measurements, and to regulate the charging circuit to increase or decrease a charge rate of the plurality of batteries as a function of the airflow.

In one example, the cooling means includes a liquid bath as the fluid for heat transfer. In another example, the plurality of batteries are at least partly immersed in the fluid, and the fluid is temperature controlled. And in a further example, the fluid is air and the cooling means includes a fan for creating the fluid flow.x

BRIEF DESCRIPTION OF THE DRAWINGS

FIG. 2 is an example diagram of power supply arrangement for use with aspects of the disclosure.

DETAILED DESCRIPTION

According to one aspect of the disclosure, a dual-loop control configuration employs battery temperature as a feedback metric in order to prevent overheating of rechargeable batteries.

In one scenario, one or more battery trays may be connected to a rack-based architecture. The rack architecture may include a main power supply, for example that provides AC or DC power. Each battery tray may include one or more batteries that may receive power and be charged by the power supply when connected to the rack. The power source may power at least one computing component, such as a computer or memory device.

The status of the batteries may be continuously monitored. If the battery status is not good, for example, there is some temperature abnormality, the system may vary the fan speed and/or the charging of the batteries. If the status of the batteries is within a normal operating zone, but the temperature is somewhat higher than normal, the system may actively manage charging of the batteries accordingly.

Figure 1A:
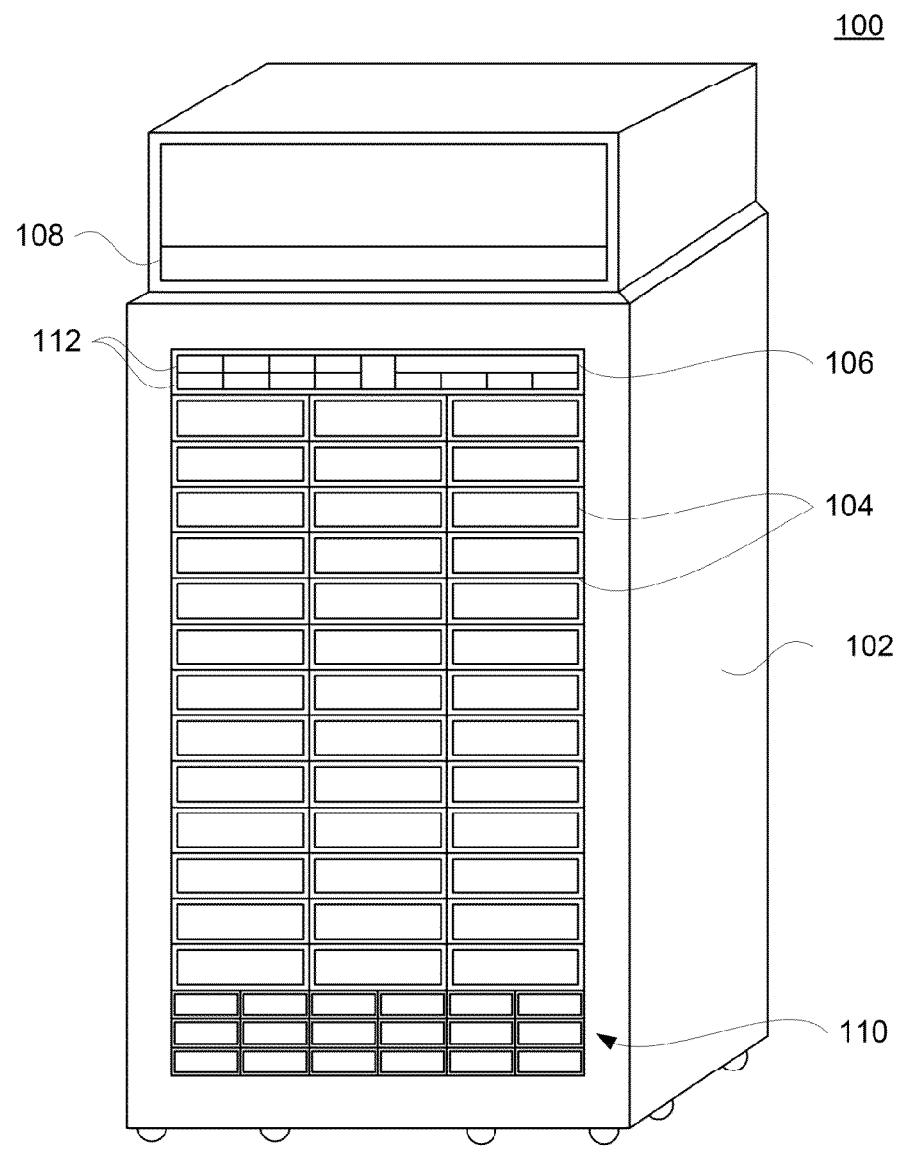
FIGS. 1A-1C are example diagrams of a rack architecture for use with aspects of the disclosure.
Figure 1B:
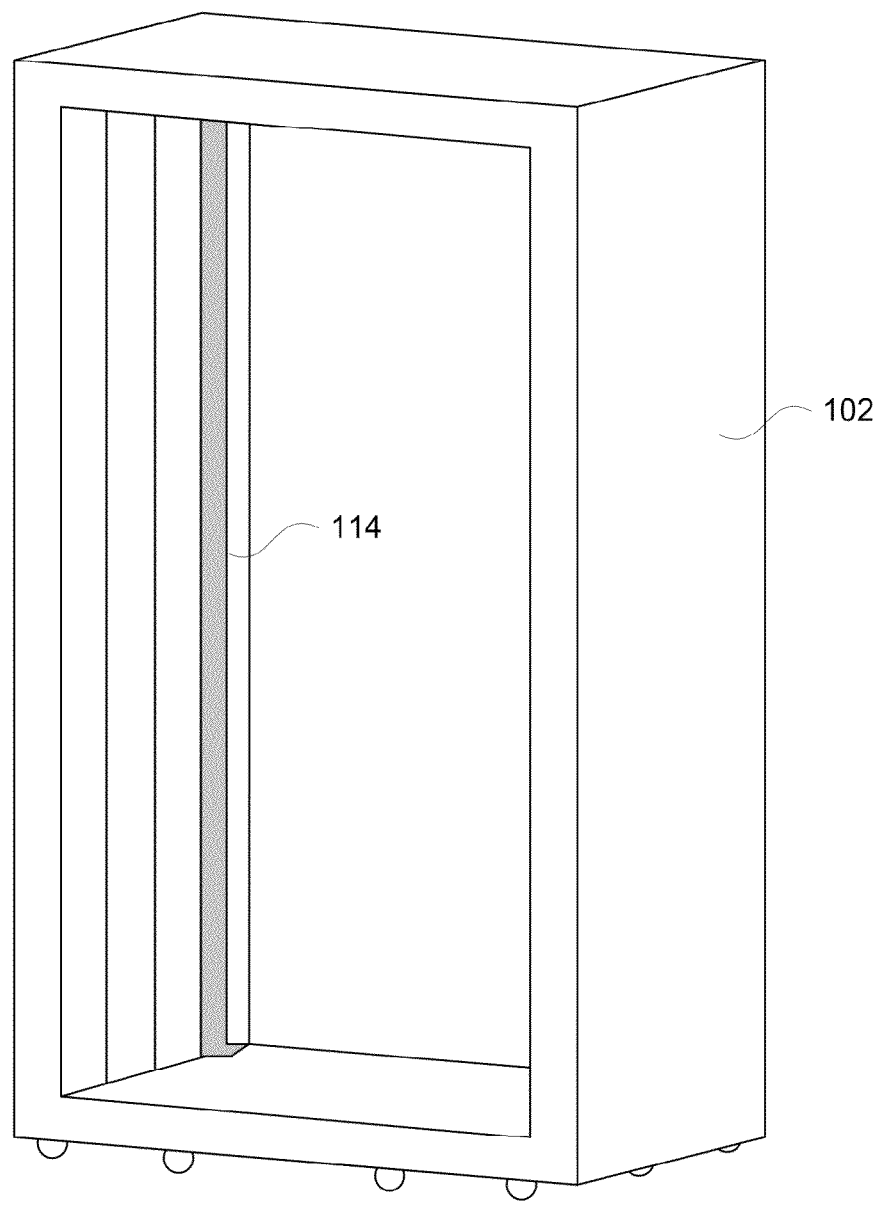

As shown in FIG. 1A, a system 100 incorporating aspects of the disclosure may include a moveable rack 102, a plurality of shelves 104 for holding various components in the moveable rack 102, a rack monitoring unit (RMU) 106 for monitoring the status of the features of the rack, a power supply connection, such as AC power supply connection 108, a battery backup (UPS) 110 and one or more rectifiers 112. The components may include servers, hard disk drives, network switches or other devices used in a data center or another type of computer network.

Each of the shelves 104 may be connected to the power supply by way of a main bus bar 114, which is shown in FIG.

1B. The main bus bar 114 may also be coupled to the AC power supply connection 108. The AC power supply connection 108 is connected to the rectifiers 112. The rectifiers 112 may be 48 volt AC to DC rectifiers, and may be connected in parallel to the main bus bar 114.

Figure 1C:
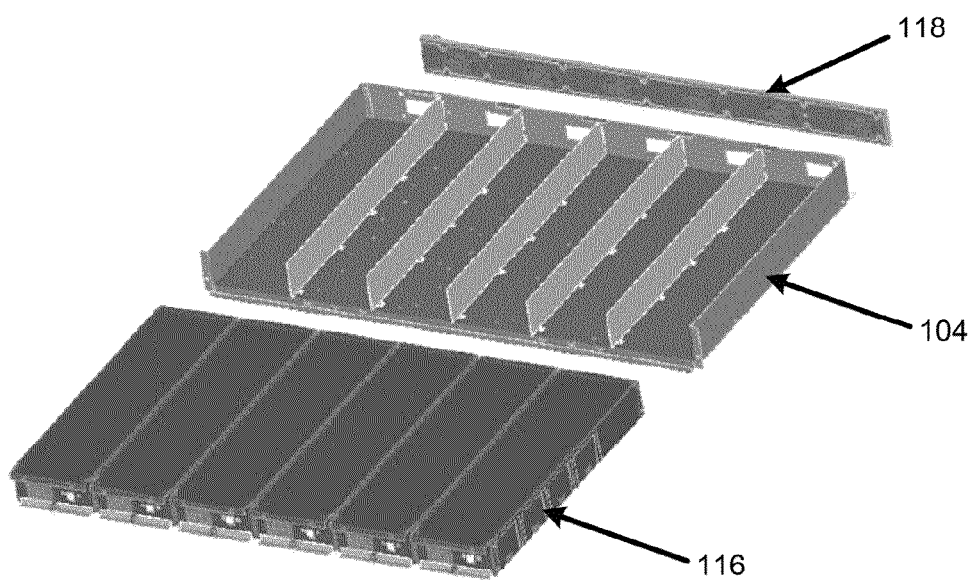

As shown in the exploded view of FIG. 1C, a given shelf 104 of the battery backup 110 may hold multiple rechargeable batteries 116 in one or more trays. The shelf 104 attaches to a battery bus bar 118, which connects to the main bus bar 114 (not shown). Returning to FIG. 1A, the UPS battery backup 110 may include a plurality of shelves for receiving the batteries. Each shelf 104 of the battery backup 110 may be equipped with its own battery bus bar 118 connected to the main bus bar.

FIG. 2 is an example of a power architecture 200 for the system 100. For instance, an AC power source (by way of AC power connection 108) supplies power to the rectifiers 112. The rectifiers provide power ($V_{ous}$) to a load 202. In this example, the load may include a plurality of components mounting in the shelves 104 of FIG. 1A. The load may also be connected in parallel to one or more power supply units ("PSU") 204 that make up the UPS battery backup 110.

In one example, each PSU 204 may comprise a given shelf 104 of the battery backup 110, which holds multiple rechargeable batteries 116. The batteries 116 may be lead-acid batteries or another type of rechargeable battery. In one alternative, different types of batteries may be used in the same shelf 104. The PSUs 204 of the UPS battery backup 110 are used to power the load 202 in the event of a failure of the AC power supply.

Figure 3:
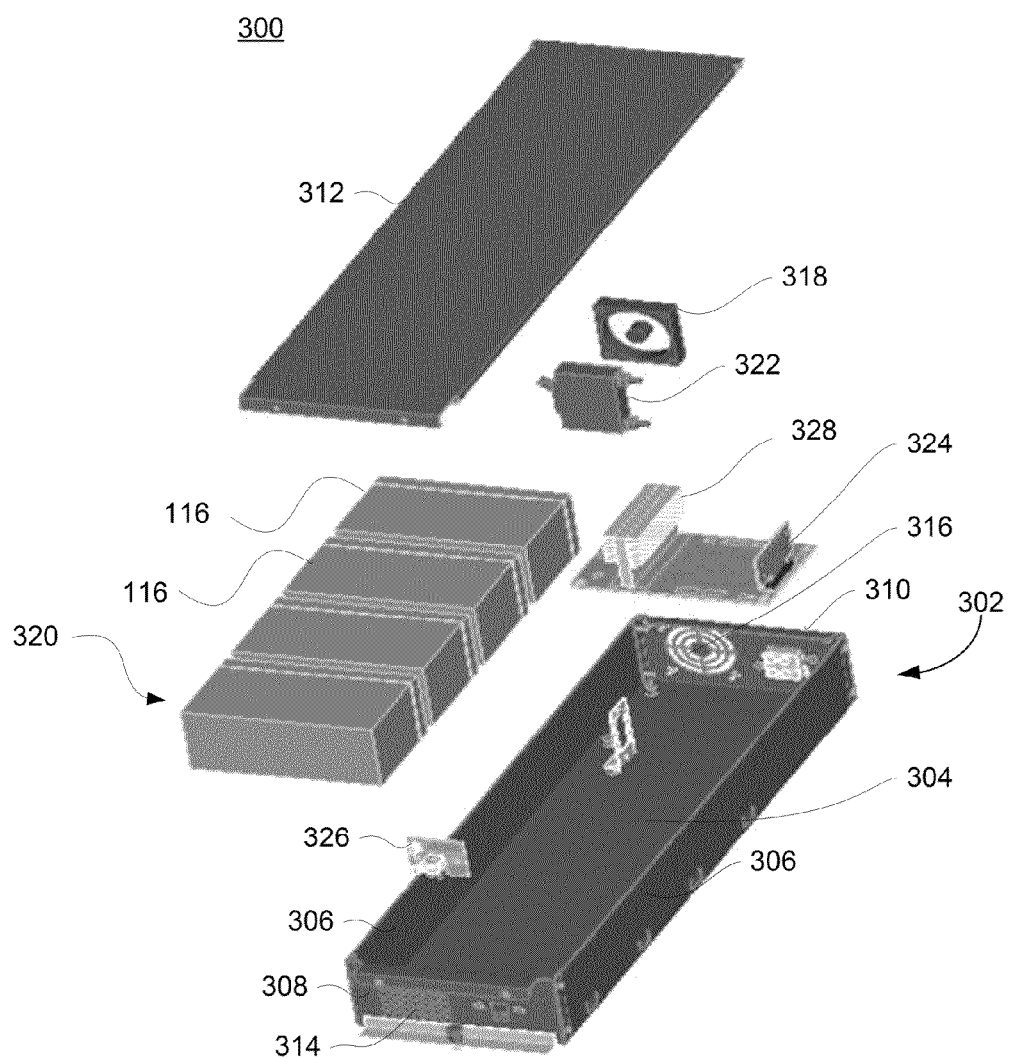
FIG. 3 is an example diagram of a battery tray in accordance with aspects of the disclosure.

FIG. 3 is an exploded view of a battery tray 300 that may fit into a receptacle of a shelf 104 (see FIG. 1C). As shown, the battery tray 300 includes a rectangular housing 302 having a base 304, sidewalls 306, end walls 308 and 310, and a cover 312. In one example, the housing 302 may have dimensions of between about 20 and 26 inches by between about 4 and 8 inches by 2 to 4 inches, though the housing may be larger or smaller depending on the dimensions of the shelf 104, size of the batteries, etc. End walls 308 and 310 desirably include air openings 314 and 316, respectively. A fan 318 may be located proximate to air opening 316 for forcing air from end wall 310 across the battery pack 320 to end wall 308 and air openings 314. Alternatively, the fan 318 may force air in the opposite direction from opening 314 at end wall 308, across the battery pack 320, and out of opening 316 at end wall 310.

As shown, the battery pack 320 may include one, two or more, such as four batteries 116, which may be connected in series. While four batteries 116 are shown, the battery pack 320 may include any number of batteries depending on system requirements. Battery tray 300 may also include a circuit breaker 322, a battery interface module ("BIM") 324, as well as a USB/LED printed circuit board assembly ("PCBA") 326 and a heat sink 328. PCBA 326 may have various LEDs or other indicators for indicating the status of the battery tray 300. For instance, the LEDs may include individual red and green LEDs or a single tricolor LED visible from the front end wall 308. For example, a green LED may be illuminated when the battery tray 300 is in communication with the battery bus bar 118 and the output voltages of the batteries 116 are normal. Similarly, a red LED may be illuminated to indicate any fault conditions, such as a battery failure or other condition.

Figure 4:
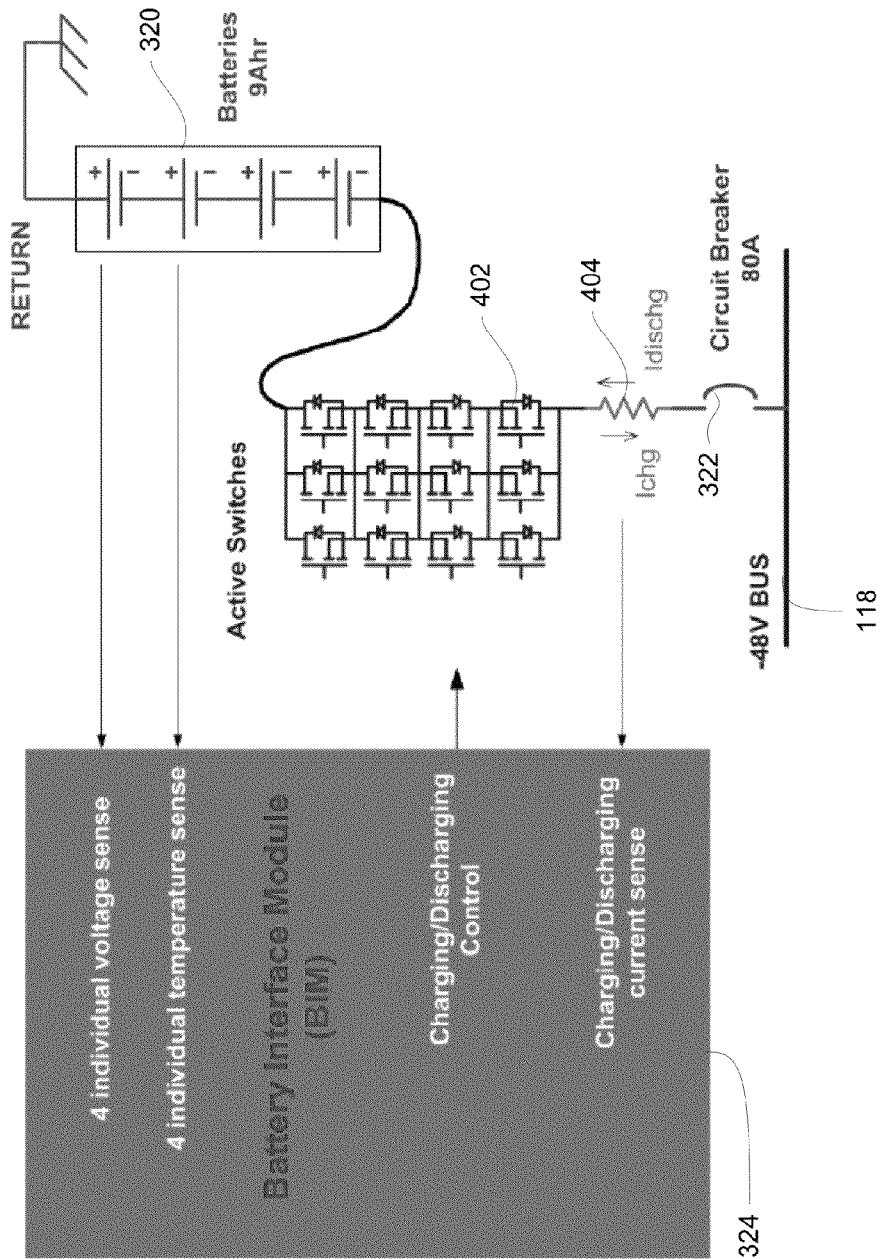
FIG. 4 illustrates a battery interface module for use with aspects of the disclosure.

FIG. 4 depicts a schematic diagram 400 of various features of the battery tray 300, including the BIM 324. One end of the battery pack 320 may be connected to the battery bus bar 118 at the return and −48 volt terminals. The battery tray connections to the battery bus bar may be polarity protected so that there is no need detect or guard against batteries connected to the +battery and −battery terminals with reversed polarity. If such reverse-polarity connections occur, it may be acceptable for the battery tray to sustain damage provided that no unsafe conditions are induced by the failure.

Though other batteries and conditions may be used, in one example, the batteries of the battery pack 320 may be 9 Ah (12 volt) batteries arranged in series as described above. For this example, the overall battery voltages across the batteries may be specified for operational conditions identified in the table below.

TABLE 1

| | Overall Battery Voltage | | |
|---|---|---|---|
| Condition | Min | Nominal | Max |
| Battery Charging | 40 V | 52-54.4 V | 54.5 V |
| Battery Discharging | 43 V | 44-48 V | 54.4 V |

The battery pack 320 may also be connected to a plurality of switches 402. The switches may be also connected to a current sense resistor 404, the circuit breaker 322, and the battery bus bar 118, here shown as −48 volts. The switches 402 may be controlled by a microcontroller such as BIM 324. The BIM 324 may receive temperature and voltage information from one or more sensors of the battery pack 320 or elsewhere in the battery tray 300 (see FIG. 5). The BIM 324 may also be in communication with the current sense resistor 404. The current sense resistor 404 may provide the BIM 324 with the charging and discharging current through the switches 402. As described in more detail below, the BIM 324 or other control component may use the temperature sensor information, battery voltage information, and/or the information from the current sense resistor 404 to control the state of the switches 402 and/or the fan 318.

According to one aspect, BIM 324 supports battery charging and discharging. The battery charging circuit may be designed such that the switches 402 may limit the charging current. When the battery tray 300 is initially placed into the rack 102, the BIM 324 may generate a voltage in order to allow battery charging. The BIM 324 may be used to charge the batteries 116 from the voltage from the battery bus bar. This voltage may be derived from the output voltage of the rectifiers 112 and provided to the main bus bar 114, for example, 42-60V. In this example, each battery tray's charging circuit may be capable of supplying up to 55.5 W to charge the batteries 116 in the tray 300. Therefore the overall charging power of a rack 102 having 18 battery trays 300 may be up to 990 W.

Each individual battery tray 300 of the rack 102 may monitor and limit the average battery charging current and/or the battery temperature to a safe level. This may allow the system 100 to control the charging current for the batteries 116. BIM 324 or another controller component in the system may regulate the charging current based on the charging current feedback detected at the current sense resistor 404. For example, the current used to charge the batteries may be low relative to the discharging current supplied by the batteries if the power supply is lost or fails. The charging circuit may be used to keep the current low when operated in the linear region. If the charging current becomes too high, the charging circuit may heat up and possibly fail.

The BIM 324 or other controller may be associated with a reference current value. This value may be set through a pulse-width modulation ("PWM") signal. For example, the reference current may be set to 1 amp and may be adjusted in order to control the charging current of the batteries. If the charging current is lower than the reference current value, the BIM 324's output may go into saturation, where the controller no longer controls the charging current.

Initially, the battery voltage of the battery pack may be much lower than the output of the power supply. When the charging current feedback detected at the current sense resistor 404 is low, BIM 324 may adjust the reference current by increasing the voltage at the positive terminal of the controller.

In addition to feedback from the current sense resistor 404, BIM 324 may also adjust the charging current based on information regarding the state of the charging batteries. For example, as described in more detail below, temperature data for the battery tray 300 may be computed periodically from the batteries themselves, heat sinks or temperature sensing devices. If the battery temperature is increasing, but has not reached some danger threshold where the charging must be stopped and the tray shut down, BIM 324 may reduce the reference current, for example to less than 1 amp. This may assist in reversing, stopping, or slowing the temperature increase of the batteries and also prolong the life of the batteries themselves.

The voltages of the batteries in a tray may be measured by using a voltage divider from each battery and feeding the divided voltage into an analog to digital converter ("ADC") (not shown). The ADC may also measure the battery current at the current sense resistor 404. The output of the ADC may be received by the BIM 324. If the voltage or current values exceed the maximum pre-determined operational specifications, the BIM 324 may automatically deactivate the charging circuit, change the amount of charging and/or vary the fan speed.

Figure 5:
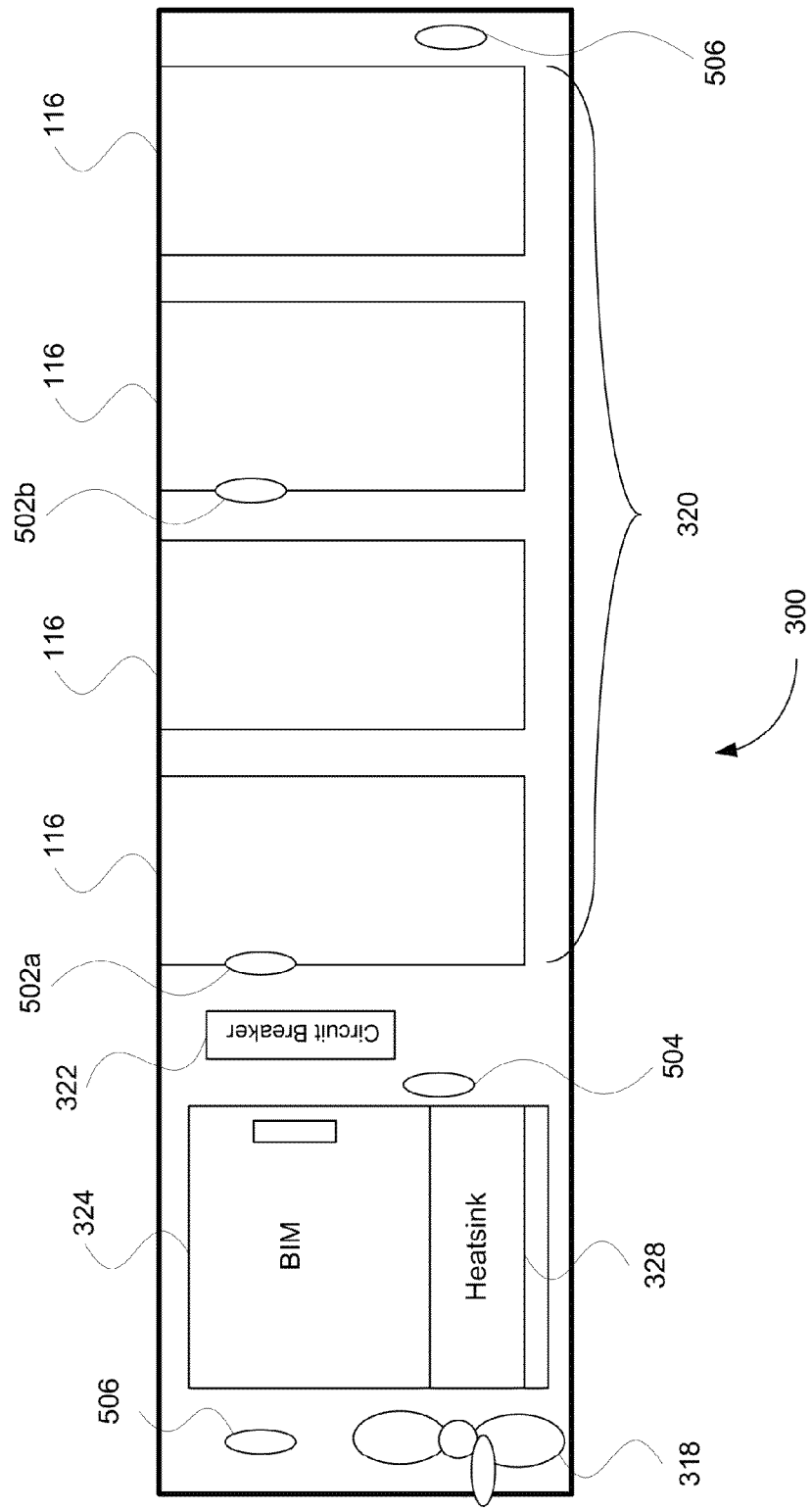
FIG. 5 illustrates temperature measurement in accordance with aspects of the disclosure.

As discussed above, according to one aspect of the disclosure, battery temperature is employed as a feedback metric in order to prevent overheating of the batteries. Temperatures may be monitored from individual sensors for each battery. For example, temperatures may be measured, as shown in FIG. 5, using temperature sensors 502a and 502b at one or more of the batteries 116 of battery pack 320 to measure the temperature of that respective battery. The output of the temperature sensors 502 may also be fed into the ADC. The temperatures may be updated periodically, for example, at least once or twice per second. While only one fan 318 is shown in the tray 300, it is possible to include multiple fans at different locations within the tray 300. In addition to the one or more sensors 502 associated with the batteries, the system may include an additional set (or sets) of sensors arranged throughout the housing to measure temperatures elsewhere in the housing. These may include sensors 504 and 506, which are described below.

In order to determine whether the batteries 116 are overheating, the batteries 116 may be associated with an overall temperature measurement tolerance over the pre-determined operating specifications of the battery tray. For example, an overall temperature measurement tolerance may be ±1° C. over the specified operating temperature at the battery or ±2° C. over the specified operating temperature at the battery. If the BIM 324 detects temperatures above these tolerances, the switches 402 may automatically be switched to a deactivated condition. Alternatively, BIM 324 may either change the charge current for one or more battery packs 320, vary the fan speed, or both.

Once the temperatures of the batteries have fallen significantly, the battery tray 320 may return to normal operation. For example, if the maximum battery operating temperature is 50° C., operation of the batteries at or above this temperature may cause the protection circuit to automatically turn the switches 402 off. In this example, when the battery body temperature drops to below some normal operating temperature (such as below 40° C.), the battery tray 320 may return to normal operation (e.g., by placing the switches 402 in an active state for charging, discharging, etc.). Similarly, if the heat sink temperature as measured by temperature sensor 504 exceeds some maximum operating temperature value (such as 90° C.), operation of the switches 402 at or above this temperature may cause the protection circuit to automatically deactivate the switches 402. Once the heat sink's temperature drops to within some normal operating range (such as below 70° C.), the battery tray 320 may return to normal operation. Additional battery performance measurements may be taken by other sensors 506 placed along the battery tray 300. The sensors 506 may measure temperature, airflow, fan speed or other conditions that may affect the performance of the batteries 116.

Figure 6:
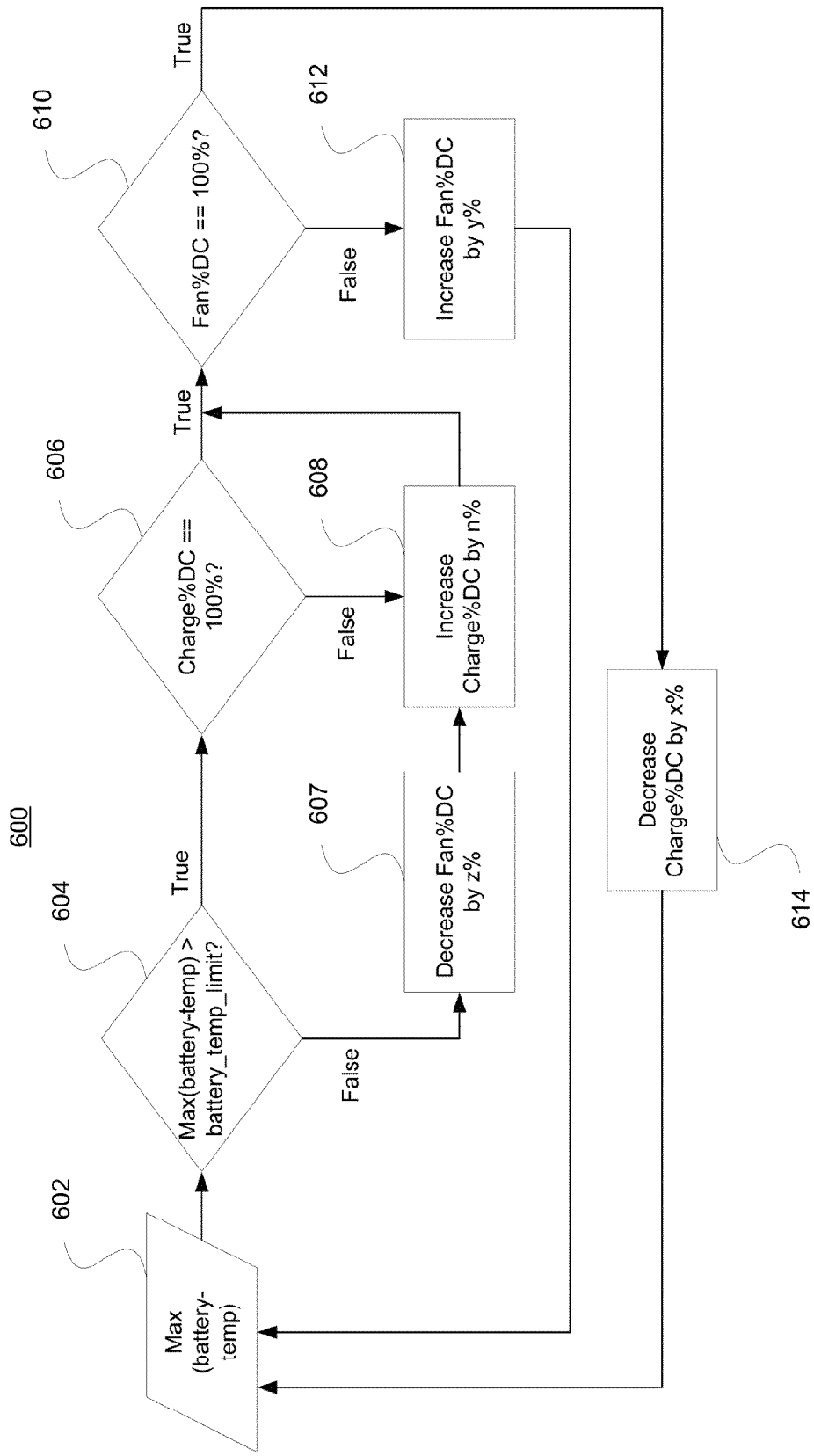
FIG. 6 illustrates dual loop control of battery charging based on temperature according to aspects of the disclosure.

FIG. 6 illustrates a process flow 600 employing dual loop control using battery temperature as a feedback metric to vary the charge rate. One of the loops provides fan control to increase or decrease airflow accordingly. When the temperature reaches a given threshold, the charge current is reduced by a predetermined increment while the fan loop process provides additional cooling. The dual control loops in the process flow 600 are used to obtain an optimal charge rate. At block 602, the maximum battery temperature is measured, for instance using one or more of the sensors in the battery pack 320 or elsewhere in the battery tray 300. The BIM 324 may receive the measurements from the sensors and identify the maximum battery temperature from the measurements. In one example, the maximum battery temperature represents the highest temperature for one of the batteries within the battery pack 320. For instance, this may be a battery placed in the middle of the battery pack.

At block 604, it is determined whether this temperature exceeds a threshold (battery_temp_limit). By way of example only, the temperature threshold may be 35° C. In other examples, the threshold may be between 30-40° C., at least about 37° C., etc. If the temperature does exceed the threshold, the process proceeds to block 606; otherwise, the process proceeds to blocks 607 and 608. At block 606, it is determined whether the battery charging is at 100% (a maximum charge rate). If so, the process proceeds to block 610; otherwise, the process proceeds to block 608. At block 607, the fan speed is decreased by a predetermined amount (z %). The predetermined amount (z) may be some percentage of the fan's full-scale revolutions per minute (RPM). By way of example only, the fan speed can be stepped down in increments of 5%, 10%, 20%, etc. At block 608, the battery charging current is increased by some predetermined amount (n %). Here, the charging may be increased as a function of fan speed. In one example, the increase is on the order of 10%, where the charge range is from 0-2 A. Thus, in this example, increases may be done in steps of about 0.2 A. The amount n may be more (or less) than 10%. This can depend heavily on the size of the fan, as the amount of airflow is a factor to consider. For example, if airflow as a function of % DC is linear for a given fan, one could employ steps of about 20% to obtain roughly 20% more cooling (at each step) as needed.

At block 610, it is determined whether the fan is operating at maximum speed. If so, the process proceeds to block 614; otherwise it proceeds to block 612. At block 612, the fan speed is increased by a predetermined amount (y %). The predetermined amount (y) may be some percentage of the fan's full-scale revolutions per minute (RPM). By way of example only, the fan speed can be stepped down in increments of 5%, 10%, 20%, etc. At block 614, the amount of charge current for the battery(ies) is decreased by a predetermined amount (x %). Similar to block 608, the charging may be decreased as a function of fan speed. In one example, the decrease is on the order of 10%, where the charge range is from 0-2 A. Thus, in this example, decreases may be done in steps of about 0.2 A. The amount x may be more (or less) than 10%. This can depend heavily on the size of the fan, as the amount of airflow is a factor to consider. For example, if airflow as a function of % DC is linear for a given fan, one could employ steps of about 20% to reduce the cooling by roughly 20% (at each step) as needed. Then after either block 612 or 614, the process returns to block 602, where the current battery temperature is obtained.

In one configuration, all batteries in a given battery pack 320 are arranged in series, and all are charged by the same current rate. As mentioned above, in one example, while temperatures may be measured for each battery in the pack, the largest (maximum) temperature measured for one of the batteries may be employed in the aforementioned process. This ensures that the hottest battery in the pack does not overheat. Alternatively, an average temperature across some or all of the batteries in the pack, an average temperature within the battery tray 300, or the hottest temperature measured by any sensor within the battery tray 300 may be used in block 602.

Furthermore, each battery tray 300 within the battery backup 110 may employ its own cooling solution based on the aforementioned process flow of FIG. 6. The BIM 324 of each tray 300 may receive the temperature measurements, perform the threshold evaluations and manage operation of the fan speed and charging increases or decreases for that respective tray 300. The temperature measurements may be taken at regular intervals, for instance according to a predetermined schedule. As discussed above, for example, the measurements may occur at least once or twice per second, although they may be taken more or less frequently depending on system requirements and conditions.

Figure 7:
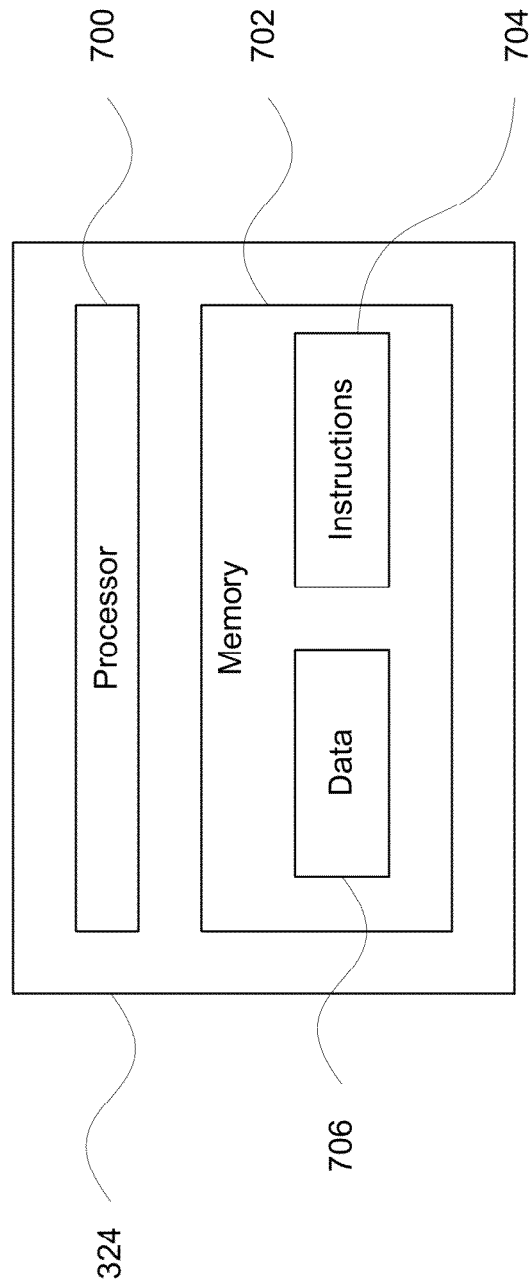
FIG. 7 illustrates components of a Battery Interface Module for use with aspects of the disclosure.

In one example shown in FIG. 7, the BIM 324 includes a processor 700 and memory 702. The processor 700 may be any well-known processing device, such as commercially available CPUs used in PCs or servers. Alternatively, the processor 700 may be a dedicated controller such as an ASIC or FPGA. The processor 700 may actually comprise a collection of processors which may or may not operate in parallel. The memory 702 may be any type of memory capable of storing information accessible by the processor 700, such as a hard-drive, memory card, ROM, RAM, optical memory or solid state memory. Memory 702 may store information accessible by processor 700, including instructions 704 that may be executed by the processor 700. Memory 702 may also include data 706 that may be retrieved, manipulated or stored by the processor. While shown as being within BIM 324, the memory 702 (or a portion thereof) may be located external to BIM 324, for instance elsewhere within the rack 100 or in an external storage system.

The instructions 704 may be any set of instructions to be executed directly (such as machine code) or indirectly (such as scripts) by the processor, for instance to manage charging and cooling control for the batteries 116 in the UPS battery backup 110 of system 100 according to process 600. The terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 706 may be retrieved, stored or modified by processor 700 in accordance with the instructions 704. The data 706 may include information regarding battery temperatures, overall system temperature, charging status, fan operation such as RPMs and/or airflow, fault status, and other information related to the thermal health of the batteries of a given battery tray (or of the battery backup system in general). Although the systems and methods herein are not limited by any particular data structure, the data may be stored in computer registers, in a relational database as a table having a plurality of different fields and records, or XML documents. The data 706 may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

In one scenario, BIM 324 is capable of direct and indirect communication with other components of system 100 or other devices, such as over a local area network ("LAN") or a wide area network ("WAN"). Thus, it is possible that BIM 324 may communicate with other devices in order to maintain charge and/or cooling control of the batteries.

While some of the scenarios presented above pertain to battery trays connected to a rack-based architecture, other scenarios and embodiments may be employed with aspects of the disclosure. For instance, the above processes and components may be incorporated into an electric vehicle such as a car, truck, etc. In such an arrangement, the system may take advantage of the outside air and conditioning of the air may not be needed in certain situations. When conditioning of the air is needed, the air may be cooled to a more optimal temperature for the batteries based on the battery condition or the capacity remaining in the batteries.

In a further aspect, a liquid bath may be used instead of employing a fan and air as the fluid for heat transfer. In one example, the battery body may be partly or fully immersed in a fluid that would be temperature controlled itself (e.g., one loop of the process in FIG. 6). The electrical charge control would feed its charge behavior to the temperature loop (e.g., as the other loop in FIG. 6). This liquid cooling solution would provide the batteries the highest life time as the system would be able to control the temperature more consistently across the battery pack area as opposed to air-cooled arrangements.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A charging system for a battery, comprising:
a charging circuit coupled to at least one battery maintained in a housing, the charging circuit configured to charge the at least one battery;
a sensor configured to measure a temperature of the at least one battery;
a fan arranged relative to the housing for creating airflow through the housing to cool the at least one battery; and
a module configured to receive temperature measurements from the sensor, to determine whether a received temperature measurement exceed a temperature threshold, to vary a speed of the fan based on the temperature measurements, and to regulate the charging circuit to increase or decrease a charge rate of the at least one battery as a function of the fan speed;
wherein, whenever it is determined that the received temperature measurements do not exceed a temperature threshold, the module decreases the fan speed and increases the charge rate.

2. The charging system of claim 1 wherein, when the received temperature measurement exceeds a temperature threshold and the battery is being charged at less than a maximum charge rate, the module increases the charge rate.

3. The charging system of claim 1 wherein, when the received temperature measurement exceeds a temperature threshold, the battery is being charged at a maximum charge rate, and the fan speed is not at a maximum speed, the module increases the fan speed.

4. The charging system of claim 1 wherein, when the received temperature measurement exceeds a temperature threshold, the battery is being charged at a maximum charge rate, and the fan speed is a maximum speed, the module decreases the charge rate.

5. The charging system of claim 1, wherein:
the at least one battery comprises a plurality of batteries;
the sensor comprises a plurality of sensors arranged to measure the temperature for corresponding ones of the plurality of batteries; and
the module determines a maximum measured battery temperature for a given one of the plurality of batteries based on the temperature measurements received from the plurality of sensors;
wherein the module is configured to increase or decrease a speed of the fan based on the maximum measured battery temperature.

6. The charging system of claim 1, wherein:
the at least one battery comprises a plurality of batteries;
the sensor comprises a plurality of sensors arranged to measure the temperature for corresponding ones of the plurality of batteries; and
the module determines an average battery temperature of one or more of the plurality of batteries based on the temperature measurements received from the plurality of sensors;
wherein the module is configured to increase or decrease a speed of the fan based on the average battery temperature.

7. The charging system of claim 1, wherein:
the at least one battery comprises a plurality of batteries;
the sensor comprises a plurality of sensors, a first set of the plurality of sensors being arranged to measure the temperature for corresponding ones of the plurality of batteries and a second set of the plurality of sensors being arranged in the housing to measure temperatures in the housing; and
the module determines a maximum battery temperature for the housing and the plurality of batteries based on the temperature measurements received from the first and second sets of the plurality of sensors.

8. The charging system of claim 1, wherein:
the at least one battery comprises a plurality of batteries arranged in series;
the charging circuit is configured to charge the plurality of batteries at the same charge rate;
the sensor comprises a plurality of sensors arranged to measure the temperature for corresponding ones of the plurality of batteries; and
the module determines a maximum battery temperature in the housing based on the temperature measurements received from the plurality of sensors.

9. A method for controlling charging of a battery, the method comprising:
receiving a battery temperature from one or more sensors in a battery housing;
determining, by a processing device, whether the received battery temperature exceeds a temperature threshold;
determining a charge rate of the battery;
varying, by the processing device, a speed of a fan based on the temperature measurements to increase or decrease airflow across the battery; and
regulating, by the processing device, the charge rate of the battery as a function of the fan speed;
wherein, whenever it is determined that the received battery temperature does not exceed the temperature threshold, varying the speed of the fan is done by decreasing the fan speed and regulating the charge rate is done by increasing the charge rate.

10. The method of claim 9, wherein when the received battery temperature exceeds a temperature threshold:
determining whether the battery is being charged at less than a maximum charge rate; and
increasing the charge rate when the battery is not being charged at the maximum charge rate.

11. The method of claim 9, wherein when the received battery temperature exceeds a temperature threshold:
determining whether the battery is being charged at a maximum charge rate;
determining whether the fan speed is at a maximum speed; and
increasing the fan speed when the battery is being charged at the maximum charge rate and the fan speed is not at the maximum speed.

12. The method of claim 9, wherein when the received battery temperature exceeds a temperature threshold:
determining whether the battery is being charged at a maximum charge rate;
determining whether the fan speed is at a maximum speed; and
decreasing the charge rate when the battery is being charged at the maximum charge rate and the fan speed is at the maximum speed.

13. The method of claim 9, wherein:
the battery comprises a plurality of batteries; and
the one or more sensors comprises a plurality of sensors arranged to measure the temperature for corresponding ones of the plurality of batteries;
wherein the method further comprises determining a maximum battery temperature for a given one of the plurality of batteries based on the temperature measurements received from the plurality of sensors.

14. The method of claim 9, wherein:
the battery comprises a plurality of batteries; and
the one or more sensors comprises a plurality of sensors arranged to measure the temperature for corresponding ones of the plurality of batteries;
wherein the method further comprises determining an average battery temperature of one or more of the plurality of batteries based on the temperature measurements received from the plurality of sensors.

15. The method of claim 9, wherein:
the battery comprises a plurality of batteries; and
the one or more sensors comprises a plurality of sensors, a first set of the plurality of sensors being arranged to measure the temperature for corresponding ones of the plurality of batteries and a second set of the plurality of sensors being arranged in the housing to measure temperatures in the housing;
wherein the method further comprises determining a maximum battery temperature for the housing and the plurality of batteries based on the temperature measurements received from the first and second sets of the plurality of sensors.

16. A battery charging apparatus, comprising:
a plurality of batteries arranged in a battery housing;
a charging circuit coupled to the plurality of batteries;
one or more sensors configured to measure a temperature of the plurality of batteries;
cooling means for creating airflow through the battery housing to cool the plurality of batteries; and
a module configured to receive temperature measurements from the one or more sensors, to determine whether the received temperature measurements exceed a temperature threshold, to vary the airflow based on the temperature measurements, and to regulate the charging circuit to increase or decrease a charge rate of the plurality of batteries as a function of the airflow;
wherein, whenever it is determined that the received temperature measurements do not exceed a temperature threshold, the module decreases the airflow and increases the charge rate for one or more of the plurality of batteries.

17. The battery charging apparatus of claim 16, wherein:
the plurality of batteries are stored in a battery tray of the battery housing; and
the cooling means comprises a fan disposed in the battery housing.

18. The battery charging apparatus of claim 16, wherein:
the battery charging apparatus is disposed in a system including a plurality of shelves supporting one or more of servers, hard disk drives and network switches;
the system includes a battery backup having the plurality of batteries;
the plurality of batteries includes a first set of batteries stored in a first battery tray and a second set of batteries stored in a second battery tray; and
the module comprises a first battery interface module and a second battery interface module, the first battery interface module is configured to receive first temperature measurements from the one or more sensors associated with the first set of batteries, to increase or decrease the airflow to the first set of batteries based on the first temperature measurements, and to regulate the increase or decrease of the charge rate of the first set of batteries, and
the second battery interface module is configured to receive second temperature measurements from the one or more sensors associated with the second set of batteries, to increase or decrease the airflow to the second set of batteries based on the second temperature measurements, and to regulate the increase or decrease of the charge rate of the second set of batteries.

19. The battery charging apparatus of claim 16, wherein:
the battery charging apparatus is disposed in a vehicle; and
the cooling means creates the airflow using air from outside of the vehicle.

20. The battery charging apparatus of claim 19, wherein the cooling means is configured to condition the air from outside of the vehicle based on a condition of the plurality of batteries or a capacity remaining in the batteries.

21. A battery charging and cooling apparatus, comprising:
a plurality of batteries arranged in a battery housing;
a charging circuit coupled to the plurality of batteries;
one or more sensors configured to measure a temperature of the plurality of batteries;
cooling means for creating fluid flow through the battery housing to cool the plurality of batteries; and
a module configured to receive temperature measurements from the one or more sensors, to determine whether the received temperature measurements exceed a temperature threshold, to vary the fluid flow based on the temperature measurements, and to regulate the charging circuit to increase or decrease a charge rate of the plurality of batteries as a function of the airflow;
wherein, whenever it is determined that the received temperature measurements do not exceed a temperature threshold, the module decreases the fan speed and increases the charge rate.

22. The battery charging and cooling apparatus of claim 21, wherein the cooling means includes a liquid bath as the fluid for heat transfer.

23. The battery charging and cooling apparatus of claim 21, wherein the plurality of batteries are at least partly immersed in the fluid, the fluid being temperature controlled.

24. The battery charging and cooling apparatus of claim 21, wherein the fluid is air and the cooling means includes a fan for creating the fluid flow.

25. The charging system of claim 1, wherein the received temperature measurement is a maximum temperature measurement.

26. The charging system of claim 1, wherein the received temperature measurement is an average temperature measurement.

* * * * *